United States Patent
Yun et al.

(10) Patent No.: US 7,594,126 B2
(45) Date of Patent: Sep. 22, 2009

(54) PROCESSOR SYSTEM AND METHOD FOR REDUCING POWER CONSUMPTION IN IDLE MODE

(75) Inventors: Byeong-Whee Yun, Yongin-si (KR); Yun-Tae Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 349 days.

(21) Appl. No.: 11/023,331

(22) Filed: Dec. 27, 2004

(65) Prior Publication Data
US 2005/0144492 A1 Jun. 30, 2005

(30) Foreign Application Priority Data
Dec. 24, 2003 (KR) .................. 10-2003-0096634

(51) Int. Cl.
G06F 1/26 (2006.01)
G06F 1/32 (2006.01)

(52) U.S. Cl. .................. 713/300; 713/320; 713/322; 713/323

(58) Field of Classification Search .................. 713/300, 713/320, 322, 323
See application file for complete search history.

(56) References Cited

U.S. PATENT DOCUMENTS

| 5,189,647 | A * | 2/1993 | Suzuki et al. ............... 368/10 |
| 6,519,707 | B2 * | 2/2003 | Clark et al. ............... 713/322 |
| 6,823,240 | B2 * | 11/2004 | Cooper ............... 700/299 |
| 6,990,594 | B2 * | 1/2006 | Kim ............... 713/322 |
| 7,043,649 | B2 * | 5/2006 | Terrell, II ............... 713/322 |
| 2004/0158747 | A1 * | 8/2004 | Kim ............... 713/300 |
| 2004/0199799 | A1 * | 10/2004 | Flynn ............... 713/300 |
| 2005/0248373 | A1 * | 11/2005 | Naffziger et al. ............... 327/105 |

FOREIGN PATENT DOCUMENTS

| JP | 08-202469 | 8/1996 |
| JP | 2000-137699 | 5/2000 |
| JP | 2001-034358 | 2/2001 |
| JP | 2002-543513 | 12/2002 |
| JP | 2003-006179 | 1/2003 |
| KR | 010028675 A | 4/2001 |
| KR | 1020030017858 | 3/2003 |
| KR | 10-2003-7002489 | 8/2003 |
| WO | WO 0217052 | 2/2002 |
| WO | WO 03/027820 | 4/2003 |
| WO | WO 03/062972 | 7/2003 |

OTHER PUBLICATIONS

English Abstract for Publication No. 2000-137699.
English Abstract for Publication No. 2001-034358.
English Abstract for Publication No. 2002-543513.
English Abstract for Publication No. 2003-006179.

* cited by examiner

Primary Examiner—Thomas Lee
Assistant Examiner—Michael J Brown
(74) Attorney, Agent, or Firm—F. Chau & Associates, LLC

(57) ABSTRACT

A processor system power voltage has low idle level as compared to a normal level during an idle mode. Power consumption of the processor during the idle mode is reduced. A power voltage supplied to the processor is increased to a normal level in returning to a normal mode from the idle mode, and a frequency of a clock signal supplied to the processor is decreased in comparison with a normal frequency. As a result, it is possible to prevent misoperation of the processor.

36 Claims, 6 Drawing Sheets

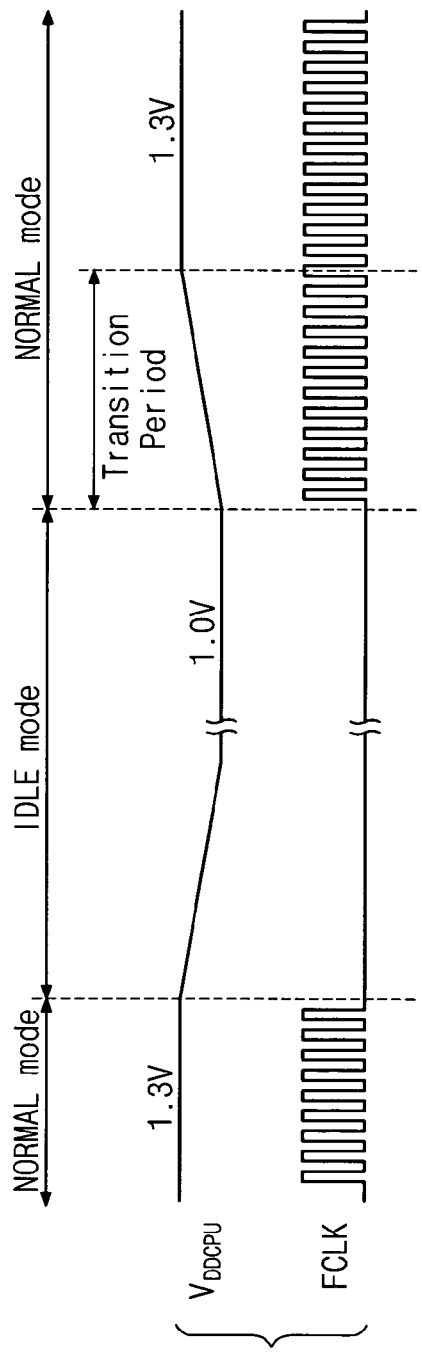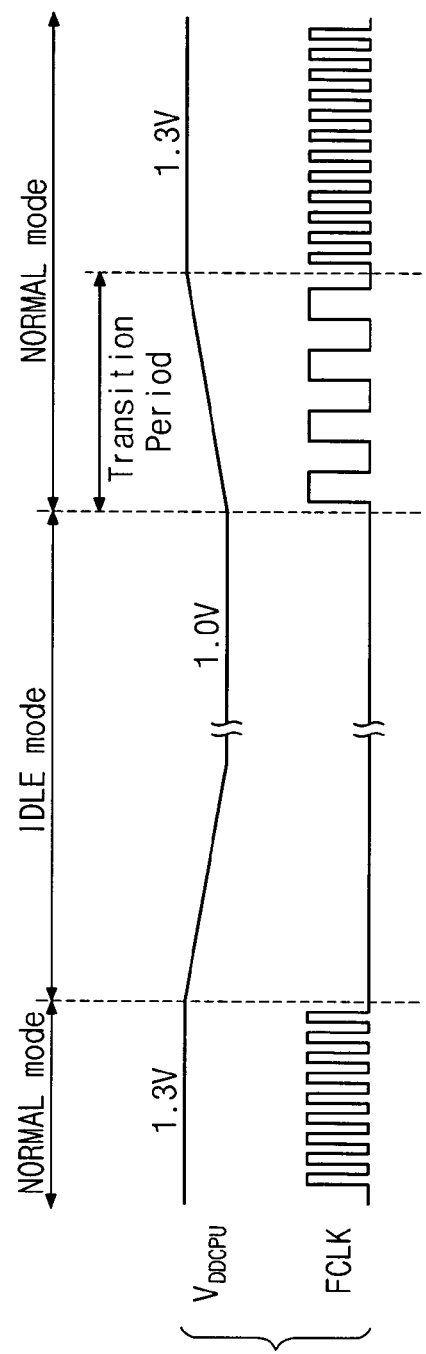

PROCESSOR SYSTEM AND METHOD FOR REDUCING POWER CONSUMPTION IN IDLE MODE

BACKGROUND OF THE INVENTION

1. Technical Field

The present disclosure relates to systems having processors, and more particularly, to a processor system and method for reducing power consumption in an idle mode.

2. Discussion of Related Art

In a processing device, power consumption of a processor accounts for a large portion of the entire power consumption of the device. The portion of power consumption attributable to the processor increases with operation speed. High performance processors having reduced power needs are important for portable electric devices operated by battery such as cell phones, PDA (Personal Digital Assistant), digital cameras, notebooks, etc.

One scheme for reducing the power consumption of a processor includes support for various operation modes according to an operation of the processor. An example of an operation mode is an idle mode. Processors include a CPU (Central Processing Unit) and other hardware modules. Each module is operated in synchronization with a clock signal generated by a clock source. In the idle mode, the CPU is not operated. Idle mode does not affect an operation state of peripheral devices (e.g., an input/output control part, another hardware module such as a memory). The idle mode is maintained until the CPU is operated again by events such as interrupts or timers. During the idle mode, the frequency of a clock signal supplied to CPU may be reduced, or a clock may be disconnected from the CPU.

The idle mode results in reduced power consumption due to the CPU being idle. The CPU can be awoken from the idle mode by an interrupt request.

Power consumption of a CMOS (Complementary Metal-Oxide Semiconductor) CPU may be determined according to the following:

$$P_{avg} = P_{switch} + P_{short\text{-}circuit} + P_{leakage} + P_{static} \quad [\text{Eq. 1}]$$
$$= a_{0 \to 1} C_L V V_{DD} f_{clk} + I_{SC} V_{DD} + I_{leakage} + I_{static} \cdot V_{DD}$$

A unit element of the CMOS comprises two complementary transistors, including a PMOS transistor and a NMOS transistor. In Eq. 1, $P_{switch}$ represents power consumption when a transistor is switched, $P_{short\text{-}circuit}$ represents power consumption when the NMOS transistor and the PMOS transistor are simultaneously connected, $P_{leakage}$ represents power consumption by leakage current, and $P_{static}$ represents continuous power consumption of a transmission gate or a bias circuit. And, where, $\alpha_{0 \to 1}$ represents a probability of a signal level of an input/output node of the CMOS element being transitioned from 0 to 1, $C_L$ represents capacitance, V represents a voltage of an input node, $V_{DD}$ represents power voltage and $f_{clk}$ represents a frequency of a clock signal supplied to CPU.

In accordance with Eq. 1, during the idle mode, switch power $P_{switch}$ is reduced, but power consumption of other modules continues as before.

SUMMARY OF THE INVENTION

According to an embodiment of the present disclosure, a method for controlling power supply for a processor system includes converting a power voltage supplied to a processor from a first level to an idle level in entering from a first mode to an idle mode, and operating the processor in a lower speed in comparison with an operation speed in a first mode until the power voltage is risen to from the idle level to the first level in returning from the idle mode to the first mode.

Operating the processor in a low operation speed includes providing a clock signal having a low frequency as compared to a frequency in the first mode to the processor until the power voltage supplied to the processor is risen to the normal level.

Operating the processor in the low operation speed comprises dividing a clock signal input from the outside the processor by a given divisor until the power voltage supplied to the processor is increased to the first level; and providing the divided clock signal to the processor.

A clock signal is input from the outside in the first mode to the processor and a clock signal is disconnected from the processor in the idle mode.

Operating the processor in a low operation speed includes changing a divisor of a clock signal supplied to the processor in accordance with the power voltage supplied to the processor in transitioning from the idle mode to the first mode.

The power voltage supplied from the idle mode to the processor is a lower idle power voltage than a first power voltage in the first mode.

According to an embodiment of the present disclosure, a method for controlling a power supply comprises decreasing the power voltage supplied to a processor in an idle mode, increasing the power voltage supplied to the processor to a first operation voltage level in transitioning from the idle mode to a first mode, and providing a clock signal having a low frequency as compared to a frequency of a first clock signal until the power voltage supplied to the processor is increased to the first level.

Providing the clock signal having low frequency to the processor comprises dividing the first clock signal by a given divisor; and providing the divided clock signal to the processor.

Providing the clock signal having low frequency to the processor includes providing the first clock signal to the processor in case that the power voltage supplied to the processor is increased to the first power voltage level.

Providing the clock signal having low frequency to the processor further includes providing the first clock signal after a predetermined time from a point of increasing the power voltage supplied to the processor.

The first clock signal is provided to the processor during the first mode.

Returning the frequency of the clock signal to a first level includes changing a divisor of a clock signal supplied from the outside in proportion to the power voltage supplied to the processor.

The clock signal supplied to the processor is disconnected in the idle mode and an idle mode signal is output by the processor when the processor enters into the idle mode.

According to an embodiment of the present disclosure, a method for controlling power supply voltage comprises converting the power supply voltage supplied to a processor from a first level to an idle level in a first mode to an idle mode and disconnecting a clock from the processor, increasing the power supply voltage supplied to the processor to a first operation voltage level in returning from the idle mode to the first mode, and providing a clock signal having a low frequency as compared to a frequency of a first clock signal until the power voltage supplied to the processor is increased to the first level.

According to an embodiment of the present disclosure, a processor system comprises a processor, a regulator for supplying power voltage in a level corresponding to an operation mode to the processor, and clock and power control block for providing a transient clock signal having a low frequency as compared to a frequency of a first clock signal until the regulator supplied a power voltage in a first level to the processor in returning from an idle mode to a first mode.

The clock and power control block includes a divider for dividing the first clock signal by a given divisor to output a transient clock signal. The clock and power control block provides the transient clock signal outputted from the divider to the processor until the regulator provides a first power voltage to the processor in returning from the idle mode to the first mode.

The clock and power control block provides the first clock signal to the processor in the first mode. The clock and power control block includes a plurality of dividers for dividing the normal clock signal at a given ratio. Each divider implements a different divisor. The clock and power control block transfers a clock signal among clock signals outputted from the dividers in transitioning from the idle mode to the first mode. The clock signal corresponds to a level of power voltage supplied to the processor by the regulator. The clock and power control block disconnects the first clock signal and the transient clock signal from the processor. The processor transfers a mode signal representing an operation mode to the control block.

According to another embodiment of the present disclosure, a processor system comprises a processor, a regulator for supplying power voltage to the processor; a dividing circuit for dividing a first clock signal supplied from outside the processor, a selector for selectively providing a divided signal outputted from the dividing circuit to the processor, and a clock and power controller for controlling the dividing circuit, the selector and the regulator in responsive to the mode signal.

The mode signal represents one of a first operation mode and an idle mode. The clock and power controller controls the dividing circuit so as to output the first clock signal supplied from the outside as the divided signal in a first operation mode. The clock and power controller controls the regulator so as to supply the first power voltage to the processor in the first mode. The clock and power controller controls the selector so as not to supply the divided signal to the processor in the idle mode. The clock and power controller controls the selector so as not to supply the divided signal to the processor in the idle mode.

The clock and power controller controls the regulator so as to supply a lower idle power voltage lower than the first power voltage to the processor during the idle mode. In addition, the clock and power controller controls the selector so as to supply the divided signal from the dividing circuit to the processor until the power voltage supplied to the processor by the regulator is increased to the first power voltage in transitioning from the idle mode to the first mode.

The dividing circuit includes a plurality of dividers for dividing the first clock signal, and each divider implements a different divisor.

The clock and power controller controls a divided signal to be supplied to the processor with increasing the power voltage supplied to the processor by the regulator in transitioning from the idle mode to the first mode.

According to an embodiment of the present disclosure, a processor system comprises a processor for outputting a mode signal representing an operation mode, a regulator for supplying power voltage to the processor, and a first dividing circuit for dividing a first clock signal supplied from outside the processor. The processor system includes a selector for selectively providing a divided signal outputted from the first dividing circuit to the processor, a clock and power controller for controlling the dividing circuit, the selector and the regulator in responsive to the mode signal, a second dividing circuit for dividing the first clock signal, and a peripheral circuit operated in responsive to a divided signal outputted from the second dividing circuit.

According to an embodiment of the present disclosure, a processor system comprises a processor for outputting a mode signal representing an operation mode, a regulator for supplying power voltage to the processor, a divide circuit for dividing a first clock signal supplied from outside the processor, and a first selector for outputting one of divided signals outputted from the first clock signal and the dividing circuit. The processor system includes a second selector for selectively providing an output signal from the first selector to the processor, a clock and power controller for controlling the dividing circuit, the first and second selectors, and the regulator, and a peripheral circuit operated in responsive to a divided signal outputted from the dividing circuit.

The processor system converts a power voltage supplied from an idle mode to a processor into an idle level lower than a first level. Therefore, a power consumption in a processor is reduced in the idle mode. In addition, in transitioning from the idle mode to the first mode, it is possible to prevent misoperation of the processor by increasing the power voltage supplied to the processor to the first level and reducing the frequency of a clock signal supplied to the processor rather than a first frequency.

BRIEF DESCRIPTION OF THE DRAWINGS

Preferred embodiments of the present invention will be described below in more detail, with reference to the accompanying drawings.

FIG. 4 shows a power voltage and a clock signal, which are supplied to a CPU transitioning from a normal mode to an idle mode and returning from the idle mode to the normal mode.

FIG. 5 shows a change in the power voltage and the clock signal, which are supplied to the CPU in a processor system according to an embodiment of the present disclosure.

DETAILED DESCRIPTION OF PREFERRED EMBODIMENTS

Figure 1:
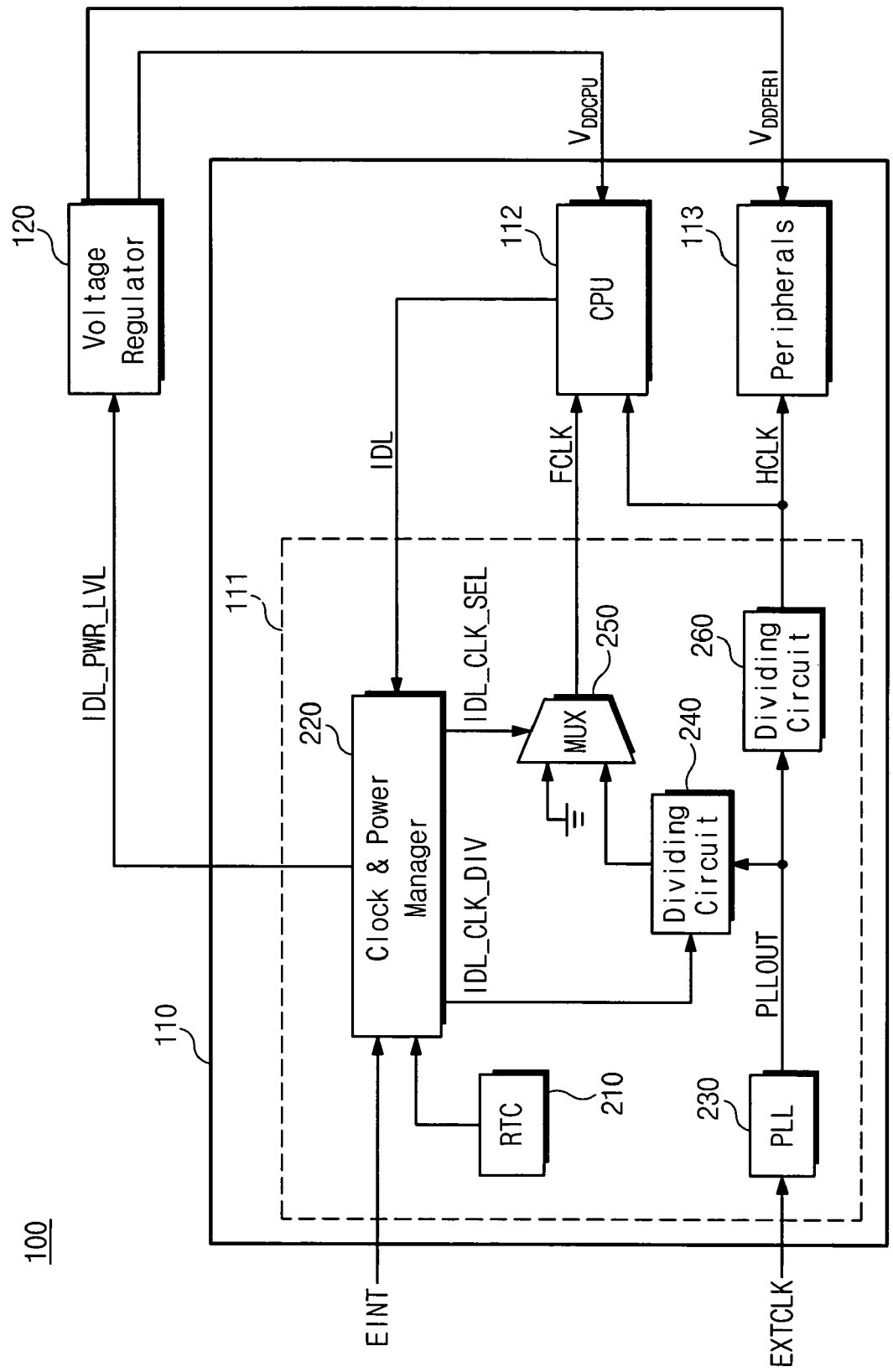
FIG. 1 shows a processor system according to an embodiment of the present disclosure.

FIG. 1 shows a processor system 100 according to an embodiment of the present disclosure. The processor system 100 includes a processor chip 110 and a voltage regulator 120. The processor chip 110 may be a microcontroller, a microprocessor, a processor, etc. The voltage regulator 120 supplies voltages $V_{DDCPU}$ and $V_{DDPERP}$ which are needed for an operation of the processor chip 110. The processor system 100 may be used in hand-held devices such as cell phones, PDAs, digital cameras, notebooks, portable credit card payment terminals, MP3 players, etc.

The processor chip 110 includes a CPU (Central Processing Unit) 112 and peripheral circuits 113. The processor chip 110 may have various processors, such as a DSP (Digital Signal Processor) instead of the CPU 112. The peripheral circuits 113 may include a memory, a memory controller, a data cache, I/O ports, a LCD controller, an UART (Universal Asynchronous Receiver/Transmitter), a DMA (Direct Memory Access), a timer, an ADC (Analog-to-Digital Conversion), a touch screen interface, a camera interface, a bus interface, a multi-media card interface, etc.

The processor chip 110 supplies a clock signal to the CPU 112 according to an operation mode, and a clock and power control block 111 for controlling power voltage. The clock and power control block 111 generates a clock signal HCLK and a clock signal FCLK. The clock and power control block 111 has a power control method for selecting a power consumption with respect to a given task. The clock and power control block 111 may activate a normal mode, a slow mode, an idle mode and a sleep mode.

The clock and power control block 111 supplies clock signals to the CPU 112 and peripheral circuits 113 in the normal mode. If all peripheral devices become turned on in the normal mode, power consumption will be maximized. An operation of peripheral devices may be controlled by software. In the idle mode, the clock and power control block 111 disconnects the clock signal FCLK supplied to the CPU 112, and supplies a clock to at least one peripheral circuit 113. Accordingly, the idle mode reduces power consumption by disconnecting the CPU 112. An interrupt may wake the CPU 112 from the idle mode. The clock and power manager 220 controls the voltage regulator 120 and reduces a power voltage supplied to the CPU 112 during the idle mode. The clock and power manager 220 reduces the frequency of the clock signal FCLK supplied to the CPU 112 in comparison with the frequency in the normal mode until the power voltage $V_{DDCPU}$ supplied to the CPU 112 is increased to the normal operation level in returning from the idle mode to the normal mode.

Referring to FIG. 1, the clock and power control block 111 includes a RTC (Real Time Clock) 210, a clock and power manager 220, a PLL (Phase Lock Loop) 230, dividing circuits 240 and 260, and a multiplexer 250. If the clock and power manager 220 is activated, a power control signal IDL_PWR_LVL is transmitted to the voltage regulator 120, which supplies an idle power voltage to the CPU 112 where an idle mode signal IDL is activated. The voltage regulator 120 determines the level of the power voltage $V_{DDCPU}$ supplied to the CPU 112 in response to the power control signal IDL_PWR_LVL. The voltage regulator 120 supplies the power voltage $V_{DDCPU}$ of an idle level (e.g., 1.0V) if the power control signal IDL_PWR_LVL is activated. If the power control signal IDL_PWR_LVL becomes inactivated, the voltage regulator 120 supplies the power voltage $V_{DDCPU}$ of a normal level (e.g., 1.3V) to the CPU 112.

The phase of an external clock signal EXTCLK is controlled by the PLL 230. The external clock signal EXTCLK is supplied from a clock source (not shown) existing outside of the processor chip 110. The clock source may be embodied by the processor chip 110 and on the chip. A clock signal PLLOUT outputted from the PLL is provided to the dividing circuits 230 and 260. The dividing circuit 240 divides the clock signal PLLOUT from the PLL 230 in response to a divided control signal IDL_CLK_DIV of the clock and power manager 220. The dividing circuit 260 comprises dividers with N divisors and outputs the clock signal HCLK by dividing the clock signal PLLOUT from the PLL 230. The clock signal HCLK is provided to the CPU 112 and peripheral circuits 113. The construction of the divider 240 is more fully described in FIG. 2.

Figure 2:
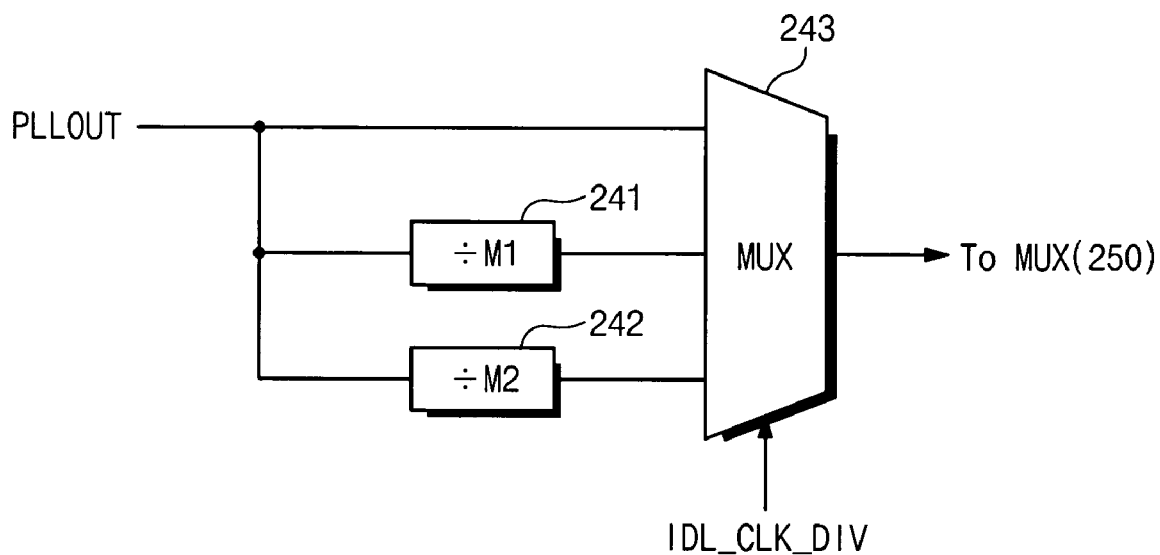
FIG. 2 shows a construction of a dividing circuit shown in FIG. 1.

Referring to FIG. 2, the dividing circuit 240 includes dividers 241 and 242, and a multiplexer 243. The dividers 241 and 242 have different dividing ratios and respectively divide the clock signal PLLOUT from the PLL 230. The multiplexer 243 supplies the clock signal from the PLL 230 and one of divided clock signals outputted from the dividers 241 and 242 to the multiplexer 250 shown in FIG. 1 in response to the divided control signal IDL_CLK_DIV from the controller 220. The dividing circuit 240 has only two dividers 241 and 242, but the number of the dividers may be variously changed. The number of bits of the divided control signal IDL_CLK_DIV supplied from the controller 220 is determined according to the number of dividers.

Referring to FIG. 1 again, the multiplexer 250 selectively supplies a signal from the dividing circuit 240 as the clock signal FCLK to the CPU 112 in response to a clock selection signal IDL_CLK_SEL. If the clock selection signal IDL_CLK_SEL is logically "0", the frequency of the clock signal FCLK becomes 0, and if the clock selection signal IDL_CLK_SEL is logically "1", a signal from the dividing circuit 240 is supplied to the CPU 112 as the clock signal FCLK. The multiplexer 250 may be replaced by a switch for selectively providing a signal from the dividing circuit 240 as the clock signal FCLK to the CPU 112 in response to the clock selection signal IDL_CLK_SEL.

Figure 3:
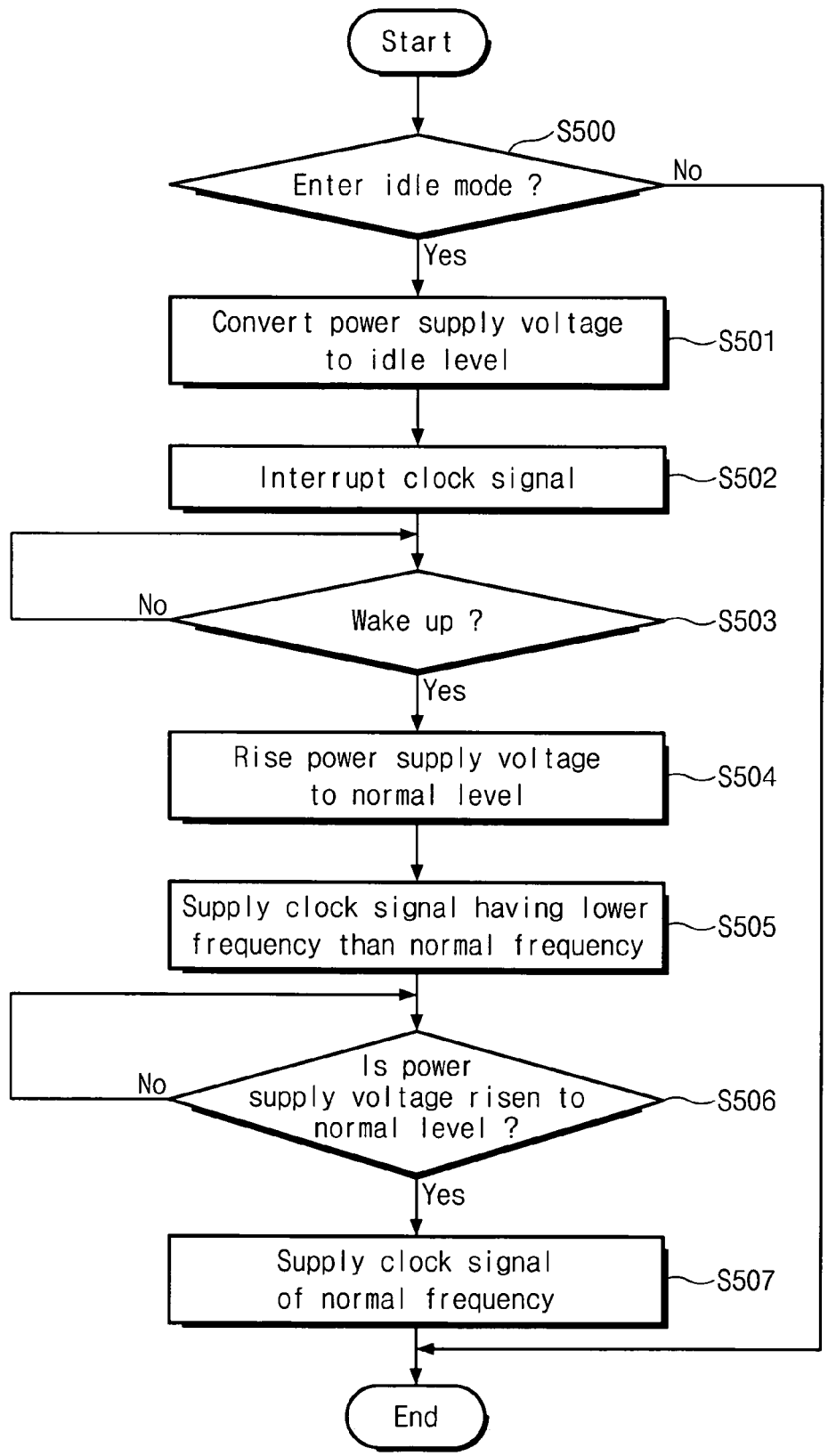
FIG. 3 is a flowchart showing a control sequence according to an operation mode of a clock and a power controller.

A control sequence according to an operation mode of the clock and power manager 220 is shown in FIG. 3. In entering the idle mode, the CPU 112 activates the idle mode signal IDL (S500). The clock and power manager 220 activates a power control signal IDL_PWR_LVL in response to an activated idle mod signal IDL. The power voltage $V_{DDCPU}$ supplied to the CPU 112 is reduced to the idle level (S501). The clock and power manager 220 sets the clock selection signal IDL_CLK_SEL to logic "0". As a result, the clock signal supplied to the CPU 112 is disconnected (S502). The clock and power control block 110 disconnects the clock signal FCLK supplied to the CPU 112 in the idle mode and reduces the power voltage $V_{DDCPU}$, thereby reducing power consumption due to the CPU 112 in the idle mode as shown in Eq 1.

The wakeup from the idle mode can be issued by the EINT or by an RTC (210) alarm interrupt (S503). Examples of a source for generating the external interrupt EINT are a keypad, a touch screen, mouse, etc.

The clock and power manager 220 inactivates the power control signal IDL_PWR_LVL. The voltage regulator 120 supplies the power voltage $V_{DDCPU}$ of the normal level to the CPU 112 in response to the power control signal IDL_PWR_LVL. A predetermined time is needed to increase the power voltage from the idle level to the normal level.

FIG. 4 shows the change of the power voltage $V_{DDCPU}$ and the clock signal FLCK, which are supplied to the CPU 112 in transitioning from the normal mode to the idle mode or from idle mode to the normal mode. If the normal mode is transitioned to the idle mode, the power voltage $V_{DDCPU}$ supplied to the CPU 112 is reduced to the idle level (1.0V), and the clock signal FLCK is disconnected.

The power voltage $V_{DDCPU}$ supplied to the CPU 112 in returning to the normal mode due to, for example, an interrupt, gradually increases to the normal level (1.3 V) (S504). In the CMOS technique, the lower the power voltage $V_{DDCPU}$ is, the slower an operation speed of the CPU is. As shown in FIG. 4, in a case where the clock signal FCLK, having a frequency with a normal state, is supplied to the CPU 112 in a transition period where the power voltage $V_{DDCPU}$ is low as compared to the normal level, the CPU 112 is misoperated. To solve these problems, according to an embodiment of present invention, a clock signal having lower frequency than a normal frequency during the transition period is supplied to the CPU 112.

Referring to FIGS. 1 and 3 again, the clock and power manager 220 outputs the divided control signal IDL_CLK_DIV so as to output the divided clock signal and sets the clock selection circuit IDL_CLK_SEL "1" logically. The dividing circuit 240 outputs the divided signal from the divider 241 in response to the divided control signal IDL_CLK_DIV. The multiplexer 250 supplies a clock signal divided from the dividing circuit 240 to the CPU 112 in response to the clock selection signal IDL_CLK_SEL. The frequency of the clock signal FLCK supplied to the CPU 112 is low a compared to the normal frequency (S505). For example, the normal frequency of the clock signal FCLK is 400 MHz, the frequency of the clock signal FCLK is (400/M1) MHz during the transition period.

The clock and power manager 220 determines whether the power voltage $V_{DDCPU}$ supplied to the CPU 112 is sufficiently increased to the normal level or not (S506). This determination may be performed by various methods. For example, the clock and power manager 220 receives the power voltage $V_{DDCPU}$ supplied from the voltage regulator 120 to detect a voltage level. In accordance with another example, time needed to increase the power voltage to the normal level is previously measured and then the time needed is set in the clock and power manager 220. The number of a clock cycles is inputted from the RTC 210. As the result, it is possible to determine whether the transition period has passed or not.

If the power voltage $V_{DDCPU}$ supplied to the CPU 112 is sufficiently increased, the clock and power manager 220 outputs the clock divided signal IDL_CLK_DIV and the dividing circuit 240 outputs the clock signal PLLOUT from the PLL 240. The clock selection signal IDL_CLK_SEL maintains "1" logically. The clock signal PLLOUT outputted from the PLL 240 is supplied to the clock signal FCLK by the dividing circuit 240 and the multiplexer 250. The clock signal FCLK having the normal frequency is supplied to the CPU 112 (S507).

FIG. 5 shows an example of the change of the power voltage $V_{DDCPU}$ and the clock signal FCLK, which are supplied to the CPU 112 according to an operation mode in the processor system 100 in accordance with an embodiment of the present disclosure. The power voltage $V_{DDCPU}$ supplied to the CPU 112 in the idle mode is a lower idle level (1.0V) than a normal level (1.3V), and the clock signal FCLK is disconnected. In returning to the normal mode from the idle mode, the divided clock signal outputted from the divider 241 is supplied to the CPU 112 during the transition period when the power voltage $V_{DDCPU}$ is increased to the normal level. Since the clock signal FCLK with low frequency is supplied to the CPU 112, an operation speed 112 is reduced. Though the power voltage $V_{DDCPU}$ supplied to the CPU 112 is low in comparison with the normal level, the frequency of the clock signal FCLK is low as compared to in case of the normal operation so that it is possible to secure a stable operation of the CPU 112.

The lower the power voltage $V_{DDCPU}$ supplied to the CPU 112 during the idle mode is, the less power is consumed by the CPU 112. Because the level of the power voltage $V_{DDCPU}$ in the idle mode is in inverse proportion to a react time (a transition period), it is possible to control the level of the power voltage $V_{DDCPU}$ in the idle mode according to a user request.

Figure 6:
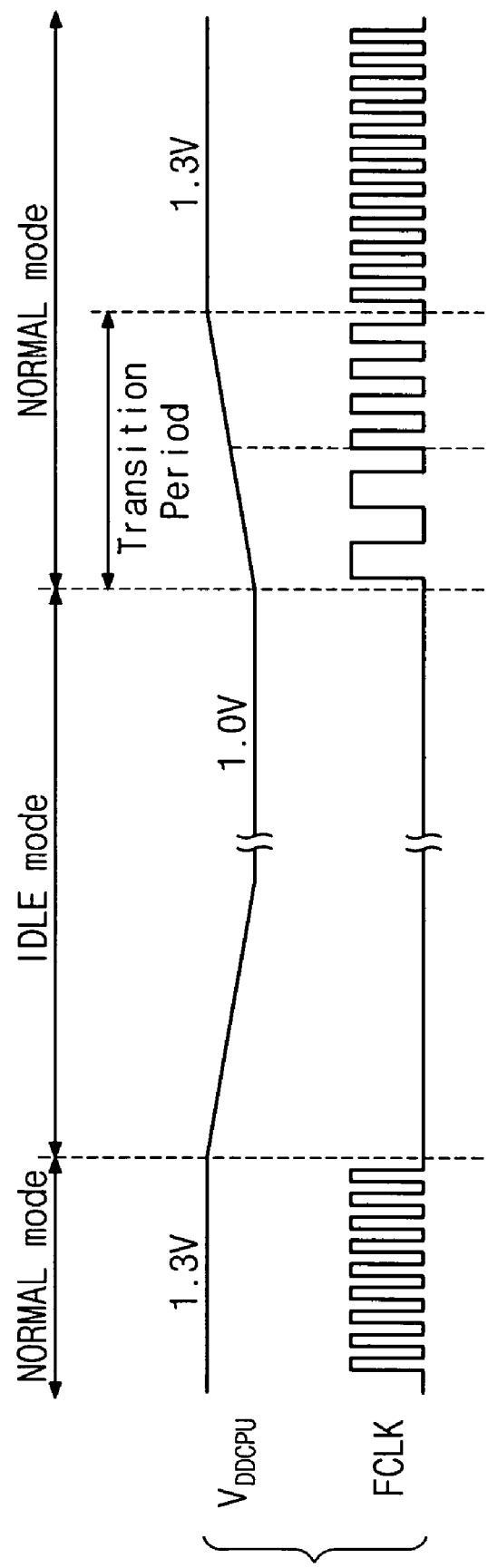
FIG. 6 shows a change in the power voltage supplied to the CPU and the clock signal according to the operation mode in a case where a divide circuit has two dividers.

FIG. 6 shows an example of the change of the power voltage $V_{DDCPU}$ supplied to the CPU 112 and the clock signal FCLK according to an operation mode in case that a divide circuit 240 has two dividers as shown in FIG. 2. In returning to the normal mode from the idle mode, a clock signal, divided to M1 by a divider 241, is supplied to the CPU 112 as a clock signal FCLK. If the power voltage $V_{DDCPU}$ is increased to a predetermined level (e.g., (a normal level–an idle level)/2), a clock signal divided to M2 by a divider 242 is supplied to the CPU 112 as the clock signal FCLK. Where, the divisor of the dividers 241 and 242 is M1>M2.

Considering a voltage level of the power voltage $V_{DDCPU}$ in returning to the normal mode from the idle mode, it is possible to shorten a transition period by changing the frequency of the clock signal FCLK more quickly; the faster the frequency of the clock signal FCLK, the faster the operation speed of the CPU 112.

Figure 7:
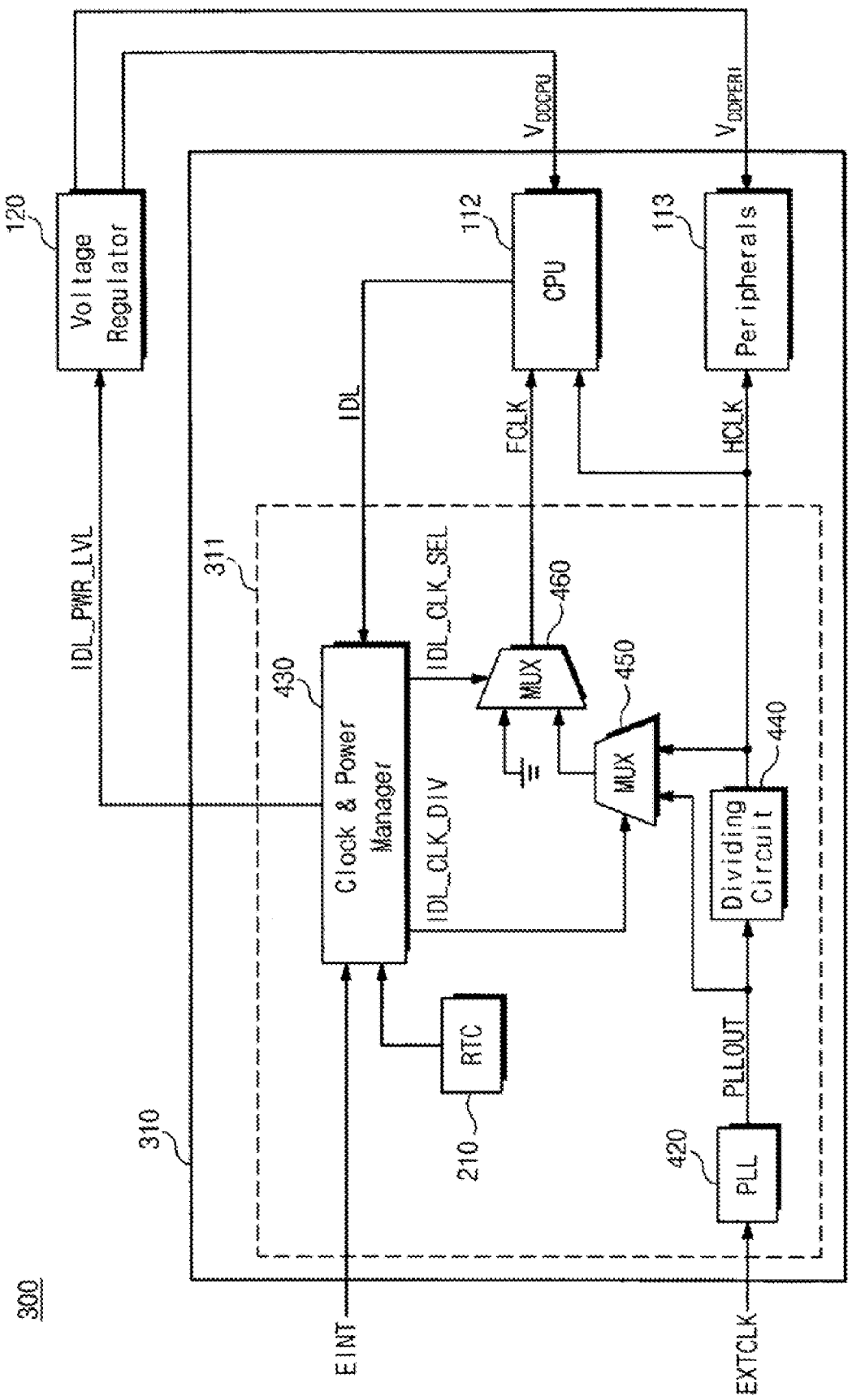
FIG. 7 shows a processor system according to an embodiment of the present disclosure.

FIG. 7 shows a processor system according to an embodiment of the present disclosure. The construction of the processor system 300 shown in FIG. 7 is similar to that of the system 100 shown in FIG. 1, and hence the repetition is thereof omitted.

The system 300 shown in FIG. 7 includes a processor chip 310 having a power control block 311, which employs a dividing circuit 440 for providing the clock signal HCLK to a peripheral circuit 113 without additional dividing circuits for providing a clock signal with low frequency in a transition period to the CPU 112. The dividing circuit 440 comprises a divider having N divisors.

In returning to the normal mode from the idle mode, the clock and power manager 430 controls multiplexers 450 and 460 so as to supply the clock signal divided by the divider 440 to the CPU 112 until the power voltage $V_{DDCPU}$ is sufficiently increased to the normal level. In case that the power voltage $V_{DDCPU}$ is sufficiently increased to the normal level in the normal mode, the clock signal PLLOUT from the PLL 420 is supplied to the CPU 112 as the clock signal FCLK. The clock signal FCLK supplied to the CPU 112 is disconnected in the idle mode.

According to an embodiment of the present disclosure, a power voltage having an idle level lower than a normal level is supplied to a processor during the idle mode, so that it is possible to reduce a power consumption of the processor during the idle mode. In addition, in returning to the normal mode from the idle mode, it is possible to prevent misoperation of the processor by increasing a power voltage supplied to the processor to the normal level and making low the frequency of a clock signal supplied to the processor rather than a normal frequency.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure the invention.

While the invention has been disclosed with respect to preferred embodiments, the specific embodiments as disclosed and illustrated herein are not to be considered in a limiting sense. Indeed, it should be readily apparent to those skilled in the art in view of the present disclosure that the invention may be modified in numerous ways. The inventor regards the subject matter of the invention to include all combinations and sub-combinations of the various elements, features, functions and/or properties disclosed herein.

What is claimed is:

1. A method for controlling a power supply voltage comprising:
    converting the power supply voltage supplied to a processor from a first level to an idle level in an idle mode;
    operating the processor at a low operation speed in comparison with an operation speed in a first mode until the power supply voltage is increased to the first level,
    wherein operating the processor at the low operation speed includes providing a clock signal having a low frequency as compared to a frequency in the first mode and having a high frequency as compared to a frequency in the idle mode, to the processor until the power supply voltage supplied to the processor is increased to the first level,
    wherein operating the processor in the low operation speed comprises:
        dividing a clock signal inputted from outside the processor by a given divisor until the power supply voltage supplied to the processor is increased to the first level;
    wherein a clock and power control block includes a plurality of dividers for dividing the first clock signal by the given divisor, and,
        providing a divided clock signal to the processor.

2. The method of claim 1, further comprising providing the clock signal inputted from outside the processor in the first mode to the processor.

3. The method of claim 1, further comprising disconnecting the divided clock signal supplied to the processor in the idle mode.

4. The method of claim 1, wherein operating the processor in a low operation speed includes changing the given divisor of the clock signal supplied to the processor in accordance with an increasing ratio of power supply voltage supplied to the processor in returning to the first mode from the idle mode.

5. The method of claim 1, wherein the power supply voltage supplied in the idle mode to the processor is an idle power supply voltage lower than a first power supply voltage in the first mode.

6. A method for controlling a power supply voltage comprising:
    reducing the power supply voltage supplied to a processor upon entering an idle mode;
    increasing the power supply voltage supplied to the processor to a first voltage level upon returning to a first mode from the idle mode; and
    providing a clock signal having a low frequency as compared to a frequency of a first clock signal and having a high frequency as compared to a frequency in the idle mode until the voltage supplied to the processor is increased to the first voltage level,
    wherein providing the clock signal having low frequency to the processor comprises:
        dividing the first clock signal by a given divisor, wherein a clock and power control block includes a plurality of dividers for dividing the first clock signal by the given divisor; and
        providing the divided clock signal to the processor.

7. The method of claim 6, wherein providing the clock signal having low frequency to the processor includes providing the first clock signal to the processor wherein the power supply voltage supplied to the processor is increased to the first voltage level.

8. The method of claim 7, wherein providing the clock signal having low frequency to the processor further includes providing the first clock signal after a predetermined time from a point of increasing the power supply voltage supplied to the processor.

9. The method of claim 7, further comprising providing the first clock, signal to the processor in the first mode.

10. The method of claim 6, wherein returning the frequency of the clock signal to a first voltage level includes changing a divisor of a clock signal supplied from outside the processor in proportion to the power supply voltage supplied to the processor.

11. The method of claim 6, further comprising disconnecting the clock signal supplied to the processor in the idle mode.

12. The method of claim 6, further comprising outputting an idle mode signal by the processor when the processor enters into the idle mode.

13. A method for controlling a power supply voltage comprising:
    decreasing the power supply voltage supplied to a processor in an idle mode and disconnecting a clock from the processor;
    increasing the power supply voltage supplied to the processor to a first voltage level in a first mode upon exiting the idle mode; and
    providing a clock signal to the processor having a low frequency as compared to a frequency of a first clock signal until the power supply voltage supplied to the processor is increased to the first voltage level, wherein providing the clock signal to the processor having the low frequency comprises:
        dividing the first clock signal by a given divisor; and providing a divided clock signal to the processor, wherein a clock and power control block includes a plurality of dividers for dividing the first clock signal by the given divisor.

14. The method of claim 13, wherein providing the clock signal having low frequency to the processor includes providing the first clock signal to the processor upon the power supply voltage supplied to the processor being increased to the first voltage level.

15. The method of claim 14, wherein providing the clock signal having low frequency to the processor further includes providing the first clock signal after a predetermined time from a point of increasing the power supply voltage supplied to the processor.

16. The method of claim 15, further comprising providing the first clock signal to the processor in the first mode.

17. The method of claim 13, wherein returning the frequency of the clock signal to a first level includes changing a divisor of a clock signal supplied from the outside the processor in proportion to the power supply voltage supplied to the processor.

18. The method of claim 13, further comprising outputting an idle mode signal by the processor when the processor enters into the idle mode.

19. A processor system comprising:
    a processor;
    a regulator for supplying a voltage having a level corresponding to an operation mode to the processor; and
    a clock and power control block for providing a transient clock signal in an idle mode wherein the processor operates at a low operation speed, having a low frequency as compared to a frequency of a first clock signal, wherein the clock and power control block provides the transient clock signal to the processor until the regulator provides a first voltage to the processor in a first mode, wherein the clock and power control block includes a plurality of dividers for dividing the first clock signal by a given divisor to output the transient clock signal.

20. The processor system of claim 19, wherein the clock and power control block provides the transient clock signal outputted from the divider to the processor until the regulator provides the first voltage to the processor in the first mode.

21. The processor system of claim 20, wherein the clock and power control block provides the first clock signal to the processor in the first mode.

22. The processor system of claim 19, wherein each of the plurality of dividers has a different divisor.

23. The processor system of claim 22, wherein the clock and power control block transfers a clock signal among clock signals outputted from the dividers in a transition from the idle mode to the first mode, and wherein the clock signal corresponds to a level of voltage supplied to the processor by the regulator.

24. The processor system of claim 19, wherein the clock and power control block disconnects the first clock signal and the transient clock signal from the processor.

25. The processor system of claim 19, wherein the processor transfers a mode signal representing an operation mode to the clock and power control block.

26. The processor system of claim 19, further comprising:
a dividing circuit for dividing the first clock signal supplied from outside the processor; and
a selector for selectively providing the transient signal outputted from the dividing circuit to the processor wherein the transient signal is a divided signal and wherein, the clock and power controller controls the dividing circuit, the selector and the regulator in responsive to a mode signal.

27. The processor system of claim 26, wherein the mode signal represents one of the first mode and the idle mode.

28. The processor system of claim 27, wherein the clock and power controller controls the dividing circuit so as to divide the first clock signal and supply a divided clock signal to the processor in the first mode.

29. The processor system of claim 28, wherein the clock and power controller controls the regulator so as to supply the first voltage to the processor in the first mode.

30. The processor system of claim 28, wherein the clock and power controller controls the selector so as not to supply the divided clock signal to the processor during the idle mode.

31. The processor system of claim 28, wherein the clock and power controller controls the selector so as to supply the divided clock signal to the processor until the voltage supplied to the processor by the regulator is increased to the first voltage in a transition from the idle mode to the first mode.

32. The processor system of claim 27, wherein the clock and power controller controls the regulator so as to supply an idle power voltage lower than the first voltage to the processor in the idle mode.

33. The processor system of claim 26, wherein the dividing circuit includes a plurality of dividers for dividing the first clock signal.

34. The processor system of claim 26, wherein each of the dividers includes a different divisor.

35. The processor system of claim 34, wherein the clock and power controller controls a divided signal to be supplied to the processor by the regulator in transitioning from the idle mode to the first mode.

36. A processor system comprising:
a processor for outputting a mode signal representing an operation mode;
a regulator for supplying a voltage to the processor;
a first dividing circuit for dividing a first clock signal supplied from outside the processor;
a first selector for selectively providing a divided signal outputted from the first dividing circuit to the processor;
a clock and power controller for controlling the first dividing circuit, the selector and the regulator in response to the mode signal;
a second dividing circuit for dividing the first clock signal;
a peripheral circuit operated in response to a divided signal outputted from the second dividing circuit;
a second selector for selectively providing the divided signal from the first selector to the processor wherein the clock and power controller controls the first and second dividing circuits, the first and second selectors, and the regulator; and
a peripheral circuit operated in response to the divided signal outputted from the dividing circuit.

* * * * *